United States Patent Office 2,801,250
Patented July 30, 1957

2,801,250
PROCESS FOR THE PREPARATION OF GLUTAMIC ACID AND INTERMEDIATES THEREFOR

Robert H. Sullivan, Woodbury, N. J., assignor to E. I. du Pont de Nemours and Company, Wilmington, Del., a corporation of Delaware No Drawing. Application August 3, 1955, Serial No. 526,325

16 Claims. (Cl. 260—326)

The present invention relates to a novel chemical synthesis. More particularly, the present invention relates to a novel method for the preparation of glutamic acid.

Glutamic acid, otherwise known as α-amino glutaric acid, is one of the more important amino acids. It is found in nature in wheat gluten and sugar beets. Since the alpha carbon atom of a molecule of glutamic acid is asymmetric, the compound exists in two enantiomorphic forms, one dextrorotatory and one levorotatory. The l-glutamic and d-glutamic acids are optical antipodes. Only the dextrorotatory isomer is found widely in nature.

Glutamic acid has a number of important uses, particularly in the fields of nutrition and pharmacology. Folic acid, one of the B-vitamins is a derivative of glutamic acid. The mono-sodium salt of d-glutamic acid enhances the meat-like flavor of certain foods. Because of this property, small amounts of glutamic acid are frequently added to canned soups and vegetables.

The therapeutic value of calcium glutamate as a calcium source and of glutamic acid hydrochloride for the treatment of hypochlorhydria has been reported in the literature. Glutamic acid has been found experimentally to hasten the learning processes of rats, and has been used beneficially in the treatment of petit mal and other psychomotor seizures in human beings.

Commercially, glutamic acid is usually prepared by the hydrolysis of certain vegetable proteins. This is, however, an inefficient and costly technique because of the high proportions of by-products which are produced. In the hydrolysis of wheat gluten, for example, approximately eleven pounds of starch are obtained for every pound of glutamic acid.

It is a general object of the present invention to provide a process for the organic synthesis of glutamic acid which is not dependent upon its extraction from plants or vegetables. It is a further object of the invention to provide such a process utilizing cheap, readily available materials so that high yields of glutamic acid may be achieved at relatively low cost. Other and additional objects will be readily apparent from a consideration of the ensuing specification and claims.

I have discovered that glutamic acid may be conveniently prepared by a synthesis which employs dicyclopentadiene as the primary starting material. Dicyclopentadiene is a readily available commercial chemical which may be obtained in desirable quantities from the high temperature cracking of natural gas and petroleum oils as well as from coal tar. The dimer is first depolymerized to the monomer under the action of heat and the cyclopentadiene thus obtained is treated with hydrogen chloride to produce 3-chlorocyclopentene which, in turn, is converted to 3-aminocyclopentene by reaction with ammonia. Details of this latter reaction may be found in my prior application Serial Number 490,121, filed February 23, 1955, now abandoned. After first converting the amine to an amide by treatment with a suitable organic acid or acid derivative, as will be more fully hereinafter described, an oxidation is performed which opens the unsaturated alicyclic ring at its double bond to yield the alpha amido dicarboxylic aliphatic acid. The latter is then hydrolyzed to the alpha amino acid. The process may be illustrated generally by the following equations:

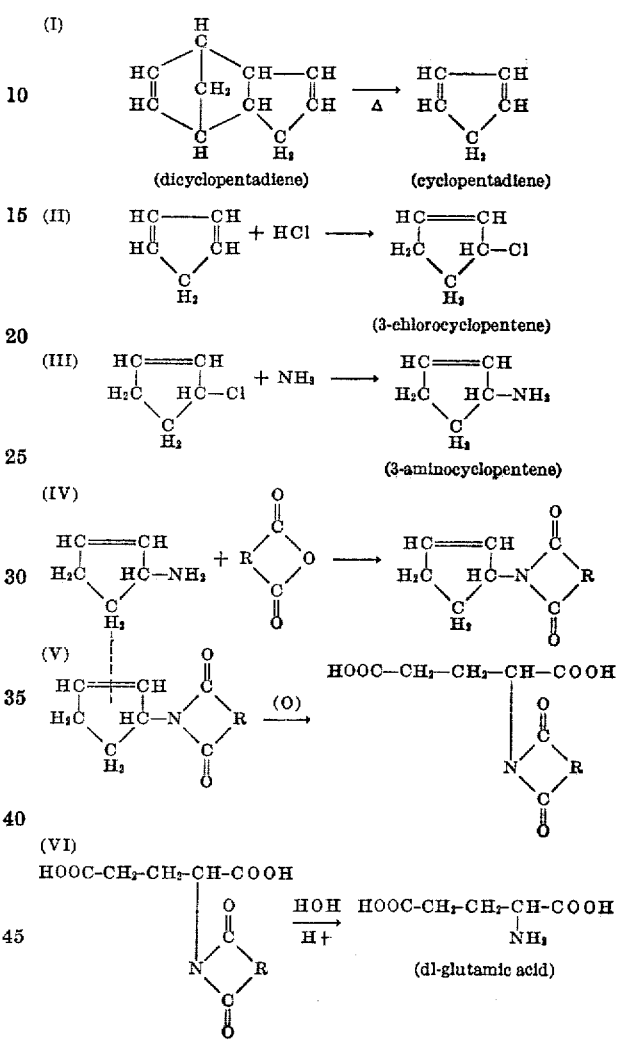

For purposes of discussion, the novel process of the present invention may be considered a six-step synthesis wherein each of the six steps is shown by the correspondingly numbered equation above. The following examples are illustrative of specific procedures for the various steps shown. It should be borne in mind, however, that the embodiments are illustrative only and are not intended as limiting the invention in any sense to the precise procedures described.

*Example 1*

To depolymerize the dicyclopentadiene (step I), 810.6 grams of technical dicyclopentadiene was added dropwise at a rate equal to the take-off rate, to 200 cc. of Nujol (a heavy mineral oil, made in the United States for Stanco, Inc.) which had been heated to about 225° C. The resultant vapors were passed through an 18" column, 1" in diameter, packed with glass beads, and the distillate was collected in a receiver cooled in Dry Ice. 707.6 grams of cyclopentadiene was obtained, which represented a yield of 87.3% based on a starting material of 100% purity.

Example 1 illustrates a preferred method of depolymerizing dicyclopentadiene (step I) which at room temperature usually exists in the form of the dimer. Alternate methods, which are quite satisfactory, include passing the dimer through a hot tube or over a hot plate, and heating the dimer to its boiling point (170° C.) in the presence of a suitable catalyst, such as iron turnings. In each instance, the distillate may be collected in a receiver cooled in Dry Ice or in a receiver containing toluene in which the monomer forms a solution which is relatively stable when stored in the absence of oxygen.

*Example 2*

To hydrohalogenate the cyclopentadiene to 3-chlorocyclopentene (step II), 352 grams of gaseous hydrogen chloride was added to 707.5 grams of the chilled cyclopentadiene at a rate which did not permit the temperature to rise above 10° C. The reaction flask was evacuated for a period of two hours to remove unreacted cyclopentadiene. 1018.2 grams of 3-chlorocyclopentene was recovered, representing a yield of 96%.

Prior to the addition of the gaseous hydrochloride the cyclopentadiene may be dissolved in an inert solvent, such as toluene or hexane. If desired the 3-chlorocyclopentene may be purified by distillation under reduced pressure through a short column in lieu of evacuation as illustrated in this example.

The following procedure was used to convert the 3-chlorocylopentene to 3-aminocyclopentene, which is step III of the over-all process.

*Example 3*

A mixture of 150 grams of 3-chlorocyclopentene, 150 grams of toluene, and 600 grams of liquid ammonia was charged to a pressure vessel chilled in Dry Ice. The vessel was sealed and thereafter removed from the Dry Ice. The temperature was allowed to rise to about 30° C., and the mixture was maintained at this temperature under autogenous pressure for about 30 minutes. Ammonia was then vented from the vessel until the gauge indicated a pressure of zero. 70.3 grams of ammonium chloride was separated from the toluene solution of 3-aminocyclopentene by filtration. The yield of 3-aminocyclopentene was 77.8 grams dissolved in the 150 grams of toluene.

Further details of this amination process may be seen in my prior application Serial No. 490,121, filed February 23, 1955.

*Example 4*

The amination of Example 3 was repeated three separate times, and the 3-aminocyclopentene-toluene solutions were combined. 500 grams of phthalic anhydride was added and the mixture was heated to reflux. About 50 grams of water was formed which was separated, and the remaining mixture was heated to about 161° C. to remove the solvent. 770 grams of N-(3-cyclopentenyl) phthalimide was recovered representing a yield of 81% of the theoretical based on the starting material of 3-aminocyclopentene.

In lieu of the phthalic anhydride shown in Example 4, many other organic acids and/or acid derivatives may be used to "protect" the amino group. In this connection various monobasic aromatic acids and monobasic saturated aliphatic acids as well as their amide-forming derivatives, such as the anhydrides, acyl chlorides, and lower alkyl esters of such aromatic and aliphatic acids, are quite suitable. Also suitable are the polybasic aromatic acids and polybasic saturated aliphatic acids, and their amide-forming derivatives, such as the inner anhydrides, acyl chlorides, and lower alkyl esters. In fact, any monobasic acid which does not contain an easily oxidizable grouping, and any polybasic acid which will react with an amine and which does not contain an easily oxidizable grouping, such as an unsaturated —C=C— linkage, may be used in lieu of the phthalic anhydride, as is illustrated by the following examples:

*Example 5*

Adipic acid, 83 parts, was added to 275 parts of a 43% solution of 3-aminocyclopentene in toluene. Additional toluene, approximately 100 parts, was added to the semi-solid paste which formed and the mixture was refluxed for 44 hours over a water-separator. The resulting thick, pasty mass was filtered, and the residue was purified by recrystallization from about 300 parts of boiling dimethyl formamide. N,N'-di(3-cyclopentenyl) adipamide, which may be represented as

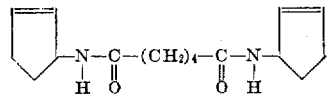

126 parts, was recovered as a tan powder. The yield of impure material was 92%. A second recrystallization from a small portion of dimethylformamide gave a white powder, melting at 231° to 234° C. (with decomposition).

*Example 6*

Phthalic acgid, 16.0 parts, and 3-aminocyclopentene, 8.2 parts, were dissolved in water, 50 parts. The solution was then heated to about 150° to 155° C. to remove the water. The residue was cooled and dissolved in methanol at room temperature. Water was then added. N-(3-cyclopentenyl) phthalimide, which may be represented as

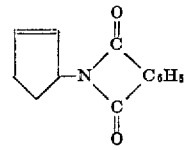

19 parts, representing a yield of 89.5% precipitated.

*Example 7*

Pyromellitic acid, 64 parts, and 3-aminocyclopentene, 51 parts, were added to approximately 200 parts of dimethylformamide. Reaction occurred at once with evolution of heat. The solution was further heated to 170° C. to remove the dimethylformamide. The residue was cooled and washed twice with water, filtered, and dried. On recrystallization from dimethylformamide, N,N'-di(3-cyclopentenyl)pyromellitimide, which may be represented as

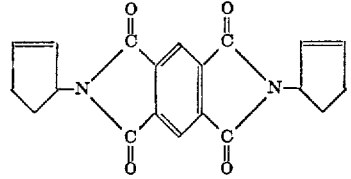

melting at 254° to 258° C., was obtained. The yield of crude material was 71.2% and of recrystallized material, 54.1%.

*Example 8*

3-aminocyclopentene, 10 parts, was added dropwise, with agitation, to 20 parts of acetic anhydride. A strongly exothermic reaction occurred. The mixture was distilled under 25 to 30 mm. pressure to remove the water, acetic acid, and excess acetic anhydride. Sufficient water was added to the solid residue to form a slurry, which was then filtered. The residue was dried and N-(3-cyclopentenyl)acetamide, which may be represented as

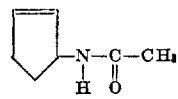

melting at 71° to 73° C., was recovered.

Example 9

Succinic anhydride, 100 parts, was added portionwise to 82 parts of 3-aminocyclopentene, dissolved in approximately 200 parts of toluene. The mixture was heated to 140° C. to remove the water and toluene. The residue was washed with 5% NaHCO₃, then 5% HCl, and, finally, water. A liquid and a solid separated from the water. The solid was isolated and identified by infrared analysis as the N,N'-di(3-cyclopentenyl)succinamide, which may be represented as

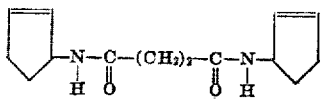

melting at 248°–250° C. The colorless liquid, distilled at 138°–140° C. at 8 mm., was identified by infrared analysis as the N-(3-cyclopentenyl)succinimide, which may be represented as

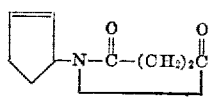

Example 10

To a solution of 3-aminocyclopentene in toluene was added slowly a slight molar excess of phthalic anhydride. A strongly exothermic reaction occurred. The mixture was heated to 80°–90° C., then distilled under reduced pressure to remove the water and toluene. The residue was recrystallized from methanol. N-(3-cyclopentenyl)phthalimide, which may be represented as

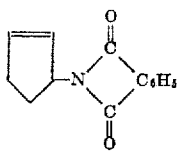

melting at 80°–81° C., was recovered.

Example 11

To a solution of 33 parts of aminocyclopentene in approximately 200 parts of pyridine was added 70 parts of benzoyl chloride dropwise. The temperature was maintained below 40° C. during the benzoyl chloride addition. The mixture was then added to water. The solid which precipitated was recovered by filtration and washed with water. The filter cake was then dissolved in methanol at room temperature, char-treated, and filtered. Water was added to the filtrate. Solid N-(3-cyclopentenyl)benzamide, which may be represented as

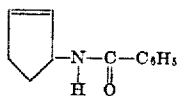

melting at 122°–123° C., was recovered in 76% yield.

Example 12

A mixture of 97 parts of a 43% solution of 3-aminocyclopentene in toluene and 18.2 parts of dimethyl succinate was sealed in a low-pressure bomb and heated at 120° C., with stirring, for 5 hours. The bomb was cooled and opened. The contents, a semi-solid mass of crystals, were filtered and washed with toluene. The brown powder, 18 parts (representing a yield of 15%), obtained was recrystallized from boiling dimethyl formamide. N,N'-di-(3-cyclopentenyl)succinamide, which may be represented as

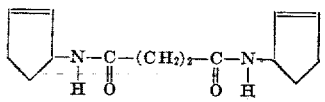

melting at 253°–256° C. (with decomposition), was recovered as light-tan crystals.

Having thus protected the amino group from attack by the oxidizing agent (step IV), I then oxidize the amide to open the alicyclic ring by splitting the double bond. This will convert the unsaturated alicyclic ring to a saturated 5-member aliphatic chain, the terminal carbons of which will be oxidized in the process to carboxyl radicals (step V). The amido group will remain intact, and will appear on the chain attached to a carbon atom alpha to one of the carboxyl radicals. The oxidation may be performed with any of several common oxidizing agents such as nitric acid, chromic acid, or potassium permanganate, etc., as is illustrated more particularly by the following examples:

Example 13

A mixture of 900 grams of 60% nitric acid, 2 grams of sodium nitrite, and 1 gram of vanadium pentoxide was heated to 60°. Hot, liquid N-(3-cyclopentenyl)phthalimide (the product of Example 4) was added to this mixture at a rate sufficient to generate enough heat of reaction to accomplish a temperature in the range of 50 to 60° C. Sufficient heat was thereafter added to maintain this temperature for an over-all total period of four hours from the start of the addition of the imide. The mixture was then cooled to 25° C. and the solids formed were filtered off. The filter cake was slurried with fresh 60% nitric acid to remove any partially oxidized material. The slurry was then filtered and the phthalylglutamic acid obtained was washed with water to remove excess nitric acid.

The preferred mode of operation is to use phthalic acid or phthalic anhydride in step IV to protect the amino hydrogens and then to oxidize the imide (an imide being a cyclic secondary amide) thus formed with 30 to 70% nitric acid. The ratio of nitric acid to the imide should be at least about 3 to 1, and the temperature should be maintained between about 30° C. and 80° C., and preferably between about 40° C. to 60° C. Optimum reaction time in this connection is about 4 to 6 hours. The use of pressure may facilitate the reaction since it may effect better gas retention. Examples 14 and 15 illustrate the use of oxidizing agents other than nitric acid (step V).

Example 14

N-(3-cyclopentenyl)phthalimide, 21.3 parts, was dissolved in approximately 800 parts of glacial acetic acid containing approximately 9 parts of concentrated sulfuric acid. Chromium trioxide, 53 parts, was added and the mixture was stirred for 20 hours at room temperature, then filtered. The filtrate was evaporated to dryness at reduced pressure. The dry mass was then dissolved in 150 parts of water. The water solution was extracted with approximately 1500 parts of ethyl acetate added in three portions. The ethyl acetate solution was concentrated to a small volume by evaporation at reduced pressure, and water was added to precipitate a mixture of phthalic acid and phthalyl glutamic acid. The mixture was then separated by repeated recrystallization. Phthalyl glutamic acid, 0.7 part, melting at 170°–185° C., was recovered.

Example 15

A solution of 100 g. potassium permanganate and 20 g. potassium hydroxide in 400 cc. water was cooled in an ice bath, and there was added a solution of 20 g. N-(3-cyclopentenyl)acetamide in 50 cc. water. The temperature was kept below 30° C. by adjusting the rate of addition. This required three quarters of an hour. After an additional half hour of agitation, the solution was decolorized with methanol. The resultant manganese dioxide was removed by filtration. The filtrate was concentrated to 150 cc. and concentrated hydrochloric acid was added dropwise. The first precipitate was found to be potassium chloride. On continued addition of hydrochloric acid a white crystalline organic precipitate (M. P. 180–182° C.) separated. This material crystallized slowly and required several hours of stirring to complete the precipitation. A total of 12.3 g. was recovered. Infrared spectra, melting point, and a mixed melting point proved this product to be the N-acetyl-dl-glutamic acid. Step VI involves the hydrolysis of the N-substituted aminoglutaric acid to the free amine, glutamic acid.

Example 16

25 grams of N-phthalylglutamic acid (the product of Example 13) was refluxed at 110° C. for fourteen hours with 50 cc. of water and 17.5 grams of 70% nitric acid. The mixture was cooled and 14.0 grams of phthalic acid precipitated and was filtered off. Ammonium hydroxide was added to the filtrate to adjust the pH to 3.2. 11.0 grams of dl-glutamic acid was obtained and filtered off, representing a yield of 85% of theoretical based on a starting material of N-phthalylglutamic acid. The dl-glutamic acid thus obtained had a melting point of 195 to 197° C.

The hydrolysis of the N-substituted aminoglutaric acid may be effected as in Example 16, i. e., by heating with water in the presence of a mineral acid catalyst (nitric acid, hydrochloric acid, sulfuric acid, etc.), or by heating with water under pressure. If the latter technique is used in connection with the N-phthalylglutamic acid of Example 14, the imide should be heated with water under pressure at a temperature of about 150 to 160° C. for a period of 1 to 2 hours. The product thus obtained will consist primarily of the pyrrolidone carboxylic acid. The latter may then be further hydrolyzed to the dl-glutamic acid by adjusting the pH to about 0.0 and heating for an additional two hours at atmospheric reflux conditions.

The glutamic acid obtained from the aforedescribed synthesis is a racemic mixture consisting of equal parts of the dextrorotatory and the levorotatory isomers. If it is desired to separate the racemic mixture into the two optical antipodes, this may be done chemically in the well-known manner by first reacting the optically inactive racemic mixture of the acid with an optically active base as, for example, l-quinine or d-cinchonine and then separating the two compositions formed. The latter are easily reconverted to the two optically active glutamic acids. This technique of chemical resolution is well known in the field of optical isomerism as is evidenced on page 101 of Karrer, "Organic Chemistry," 3rd English edition (1947), published by Elsevier Publishing Company, Inc. of New York, New York, and London, England.

The present invention affords a convenient method for synthesizing glutamic acid from relatively cheap, readily available industrial chemicals. The product is obtained in high yields without producing large amounts of costly by-products, as in the case of the extraction of glutamic acid from naturally occurring plants and vegetables. It will be readily understood that many arbitrary variations may be made in the techniques and procedures described above without departing from the spirit or scope of the invention. This being the case, I intend to be limited only by the following claims.

I claim:

1. In the process of converting 3-aminocyclopentene to glutamic acid by oxidation with a chemical oxidizing agent, the essential intermediate step of first reacting the amine with a reagent which will replace at least one amino hydrogen with a substituent that is not subject to decomposition under the action of said oxidizing agent, said reagent being selected from the class consisting of the saturated aliphatic carboxylic acids, the aromatic carboxylic acids, and the amide-forming derivatives of such acids.

2. A process as in claim 1 wherein said reagent is phthalic acid.

3. A process as in claim 1 wherein said reagent is phthalic anhydride.

4. A process for preparing glutamic acid which includes the essential step of oxidizing an N-substituted 3-aminocyclopentene to open the alicyclic ring at its double bond, and convert same to a 5-member chain having terminal carboxyl groups with the nitrogen atom positioned on a carbon atom alpha to one of said carboxyl groups.

5. In a process for the preparation of glutamic acid, the steps of reacting 3-aminocyclopentene with phthalic acid to form N-(3-cyclopentenyl) phthalimide, and oxidizing the latter with nitric acid to an N-substituted glutamic acid, and hydrolyzing the oxidized product to glutamic acid.

6. In a process for the preparation of glutamic acid, the steps of reacting 3-aminocyclopentene with phthalic anhydride to form N-(3-cyclopentenyl) phthalimide, and oxidizing the latter with nitric acid to an N-substituted glutamic acid, and hydrolyzing the oxidized product to glutamic acid.

7. A new class of compounds having the general formula

wherein X is a member of the group consisting of

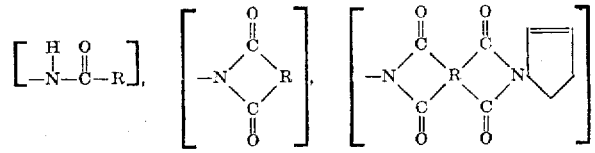

the R in each instance being selected from the group consisting of alkyl radicals and mononuclear aryl radicals having no easily oxidizable substituents.

8. N-(3-cyclopentenyl)acetamide.

9. N-(3-cyclopentenyl)phthalimide.

10. N-(3-cyclopentenyl)succinimide.

11. N,N'-di(3-cyclopentenyl)pyromellitimide.

12. In the process for preparing glutamic acid by oxidizing 3-aminocyclopentene with an oxidizing agent selected from the class consisting of chromic acid, and potassium permanganate, the step of first reacting the 3-aminocyclopentene with a reagent which will replace at least one amino hydrogen with an organic substituent which is unaffected in any way by the action of said oxidizing agent, said reagent being selected from the class consisting of the saturated aliphatic carboxylic acids, the aromatic carboxylic acids, and the amide-forming derivatives of such acids.

13. A process as in claim 12 wherein the N-substituted 3-aminocyclopentene is converted to the corresponding N-substituted glutamic acid by the action of said oxidizing agent.

14. A process as in claim 13 wherein the N-substituted glutamic acid is hydrolyzed to glutamic acid.

15. In the process for preparing glutamic acid by oxidizing 3-aminocyclopentene with nitric acid, the step of first reacting the 3-aminocyclopentene with a reagent which will replace both amino hydrogens with an organic substituent which is unaffected in any way by the action of nitric acid, said reagent being selected from the class consisting of the saturated aliphatic carboxylic acids, the aromatic carboxylic acids, and the amide-forming derivatives of such acids.

16. A process as in claim 15 wherein the reagent is phthalic anhydride.

References Cited in the file of this patent

UNITED STATES PATENTS

| | | |
|---|---|---|
| 2,072,770 | Reid | Mar. 2, 1937 |
| 2,433,500 | Wood | Dec. 30, 1947 |
| 2,468,912 | Albertson et al. | May 3, 1949 |
| 2,628,963 | Laucius et al. | Feb. 17, 1953 |

UNITED STATES PATENT OFFICE

CERTIFICATE OF CORRECTION

Patent No. 2,801,250                                      July 30, 1957.

Robert H. Sullivan

It is hereby certified that error appears in the printed specification of the above numbered patent requiring correction and that the said Letters Patent should read as corrected below.

Column 3, line 56, for "161° C." read -- 160° C. --; column 4, line 11, for "300 parts" read -- 500 parts --; line 25, for "acgid" read -- acid --.

Signed and sealed this 8th day of October 1957.

(SEAL)
Attest:

KARL H. AXLINE                                           ROBERT C. WATSON
Attesting Officer                                  Commissioner of Patents